W. Michael.
Harvester Cutter.
No. 86,774.  Patented Feb. 9 1869.
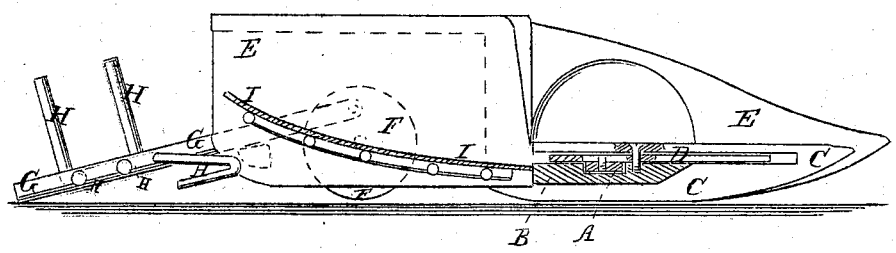
Fig: 1.
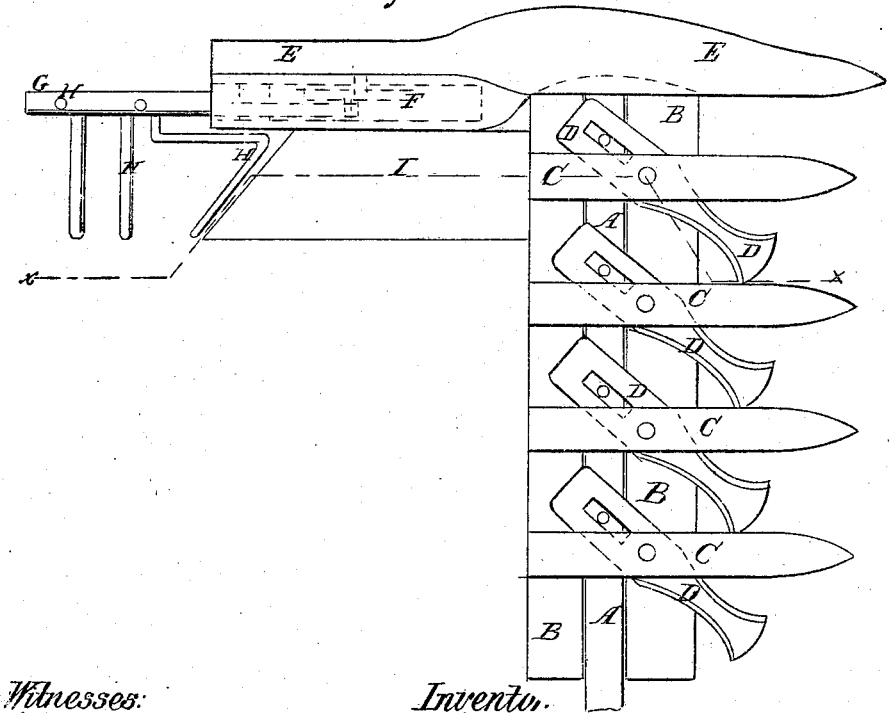
Fig: 2.
Witnesses:
Wm Morgan
P. C. Dieterich
Inventor.
W. Michael
Attorneys

UNITED STATES PATENT OFFICE.

WILLIAM MICHAEL, OF MURRYSVILLE, PENNSYLVANIA.

IMPROVEMENT IN HARVESTERS.

Specification forming part of Letters Patent No. 86,774, dated February 9, 1869.

*To all whom it may concern:*

Be it known that I, WILLIAM MICHAEL, of Murrysville, in the county of Westmoreland and State of Pennsylvania, have invented a new and useful Improvement in Harvesters; and I do hereby declare that the following is a full, clear, and exact description thereof, which will enable others skilled in the art to make and use the same, reference being had to the accompanying drawings, forming part of this specification, in which—

Figure 1 is a detail sectional view of my improved harvester, taken through the line $x\ x$ of Fig. 2. Fig. 2 is a detail top view of the same.

Similar letters of reference indicate like parts.

My invention has for its object to improve the construction of harvesters and mowers, so as to make them more effective in operation and more reliable in the various places and under the various circumstances in which they may be used, and which shall at the same time be simple in construction and not liable to get out of order; and it consists in the construction and combination of various parts of the machine, as hereinafter more fully described.

A is the sickle-bar, which vibrates in the bearing-bar B in the ordinary manner. C are the teeth, which are securely attached to the bearing-bar B, and which are slotted longitudinally and horizontally to receive the double sickle-cutters D, as shown in Figs. 1 and 2.

The cutters or double sickles D are made in about the shape shown in Fig. 2, and are pivoted to the slotted teeth C by pins or bolts passing through holes in the said cutters, and through the slotted teeth C, and into or through the bearing-bar B, as shown in Figs. 1 and 2.

The double sickle-cutters D are connected with and pivoted to the sickle-bar A by pins or bolts passing through longitudinal slots in the rear parts of said cutters, and into the said sickle-bar A, as shown in Figs. 1 and 2.

The sickle-bar A and cutters D are so arranged that the vibration or throw of the said sickle-bar A may move the forward ends of said cutters through an arc of about one hundred and twenty degrees, (120°.)

The curved edges of the cutters D, the side edges of the slotted teeth C, and the forward edge of the bearing-bar B are all formed with knife-edges, so that the said double sickle-cutters D, as they are operated by the advance of the machine, may collect and cut all the grass or grain, however much it may be lodged or tangled.

E is the shoe, which carries the end of the bearing-bar B, and which is made in about the form and manner shown in the drawings—that is to say, its rear part is enlarged and recessed, as shown in dotted lines in Figs. 1 and 2—to receive the wheel F, which is pivoted in such a position that its lower side may rest upon and be revolved by contact with the ground, as shown in Fig. 1.

To the side of the wheel F, near its circumference, is attached a crank-pin, to which is pivoted the forward end of the bar G, which passes out through an opening or slot in the rear end of the shoe E.

To the upper and inner sides of the bar G are attached arms H, as shown in Figs. 1 and 2.

The play of the bar G may be limited by the length of the slot in the rear end of the shoe E, through which it passes; or, if desired, the play of said bar may be regulated and limited by pins or other adjustable stops passing through or adjustably attached to said recessed shoe E.

By this construction, as the grass or grain is cut, the part of said grass or grain that would fall close to the edge of the uncut grass or grain is received upon the arms H of the bar G, and as the said bar is operated by the revolution of the wheel F, the said grass or grain is thrown away from the edge of the said uncut grass or grain, so as to leave a clear space for the next passage of the machine.

I is a shelf, apron, or rack, extending from the bearing-bar B to the forward arm H of the bar G, to prevent the cut grass or grain from dropping down before reaching the armed bar G H.

Having thus described my invention, I claim as new and desire to secure by Letters Patent—

1. The double sickle-cutters D, slotted as shown, in combination with the slotted teeth C, the bearing-bar B, and the sickle-bar A, the teeth C and bar B being provided with cutting-edges, as and for the purpose specified.

2. The bar G, having arms H attached to it, in combination with the wheel F and recessed shoe E, substantially as herein shown and described, and for the purpose set forth.

3. The combination of the apron, shelf, or rack I with the shoe E, bearing-bar B, and armed bar G H, substantially as herein shown and described, and for the purpose set forth.

WILLIAM MICHAEL.

Witnesses:
JAMES H. HAMILTON,
FRANCIS C. McCLURE.